H. R. RIDGLEY, G. A. NELSON & W. H. BUSHNELL.
HARNESS-PADS.

No. 181,207.	Patented Aug. 15, 1876.

UNITED STATES PATENT OFFICE.

HIBBARD R. RIDGLEY, GEORGE A. NELSON, AND WILLIAM H. BUSHNELL, OF HAYSVILLE, OHIO.

IMPROVEMENT IN HARNESS-PADS.

Specification forming part of Letters Patent No. 181,207, dated August 15, 1876; application filed June 6, 1876.

*To all whom it may concern:*

Figure 1:
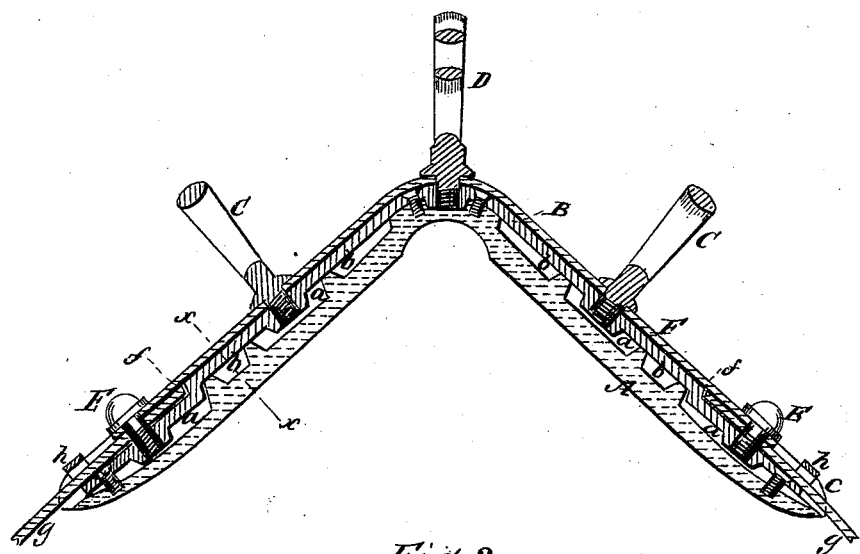
Figure 2:
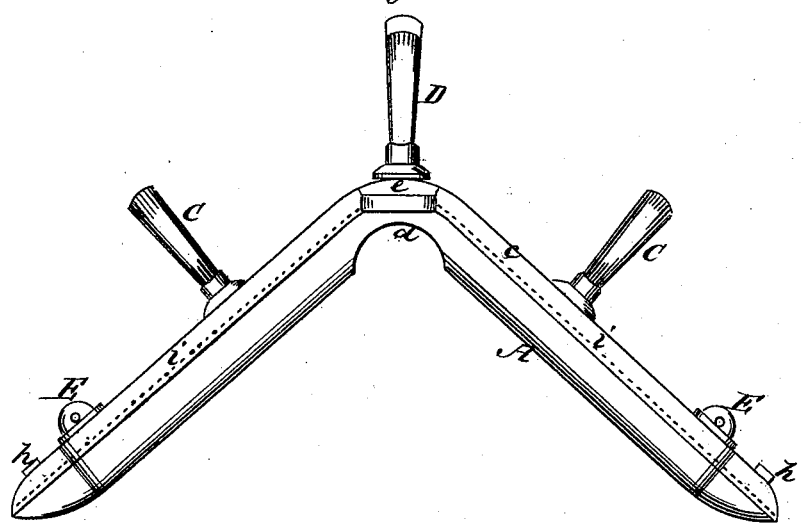
Figure 3:
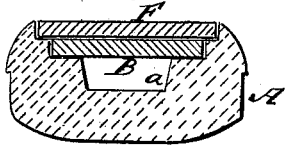

Be it known that we, HIBBARD R. RIDGLEY, GEORGE A. NELSON, and WILLIAM H. BUSHNELL, of Haysville, in the county of Ashland and State of Ohio, have invented a new and Improved Harness-Pad, of which the following is a specification:

Figure 1 is a side elevation in section. Fig. 2 is a side elevation. Fig. 3 is a section on line $x$ $x$ in Fig. 1.

Similar letters of reference indicate corresponding parts.

The invention consists in the improvement of a harness-pad, as hereinafter described, and pointed out in the claim.

The rubber pad A is provided with a rim, $c$, which is high enough to cover the edge of the tree B. At the crupper-strap eye $d$ the rim $c$ is discontinued; but the curve of the outline is made continuous by the lip $e$, which is formed on the eye $d$. The tree is offset at $f$, to receive the trace-supporting strap $g$, and a corresponding offset is made in the rubber pad. A piece of patent-leather or other durable ornamental material, F, is fitted over the tree B in such a way as to extend in all directions to the rim $c$, thus entirely covering the tree. The terrets C C, water-hook D, and the screws E E are screwed into the tree in the usual manner. Loops $h$ $h$, through which the trace-supporting straps $g$ pass, are attached to the ends of the tree B. $i$ $i$ are imitation stitches, designed for ornamentation, and at this point the rim $c$ is made to project slightly beyond the body of the pad, giving it the appearance of having been stitched together.

Having thus described our invention, we claim as new and desire to secure by Letters Patent—

The rim $c$, which forms a part of the pad A, having an offset, and provided with imitation stitches, substantially as and for the purpose specified.

HIBBARD R. RIDGLEY.
    GEORGE A. NELSON.
    WILLIAM H. BUSHNELL.

Witnesses:
 WILLIS LAIRD,
 BYRON SEAMANS.